(12) United States Patent
Keal et al.

(10) Patent No.: US 10,791,425 B2
(45) Date of Patent: *Sep. 29, 2020

(54) MOBILE TAG SENSING AND LOCATION ESTIMATION

(71) Applicant: enLighted, Inc., Sunnyvale, CA (US)

(72) Inventors: William Kerry Keal, San Jose, CA (US); Tanuj Mohan, Mountain View, CA (US); Gaile Gordon, Palo Alto, CA (US)

(73) Assignee: Enlighted, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/953,466

(22) Filed: Apr. 15, 2018

(65) Prior Publication Data

US 2019/0104383 A1 Apr. 4, 2019

Related U.S. Application Data

(60) Provisional application No. 62/568,032, filed on Oct. 4, 2017.

(51) Int. Cl.
*H04W 4/029* (2018.01)
*H04W 4/33* (2018.01)
*G01S 5/00* (2006.01)

(52) U.S. Cl.
CPC .............. *H04W 4/029* (2018.02); *G01S 5/00* (2013.01); *H04W 4/33* (2018.02)

(58) Field of Classification Search
CPC ......... H04W 4/029; H04W 4/33; H04W 4/03; G01S 5/00

USPC ...................................................... 455/456.1
See application file for complete search history.

(56) References Cited

U.S. PATENT DOCUMENTS

| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |

(Continued)

FOREIGN PATENT DOCUMENTS

WO WO2016-026979 2/2016

OTHER PUBLICATIONS

PCT Search Report dated Jan. 11, 2019, for PCT Application No. PCT/US18/53048, 15 pages.

*Primary Examiner* — Julio R Perez

(57) ABSTRACT

Apparatuses, methods, and systems for estimating a location of a tag are disclosed. One method includes sensing a first condition of a structure, sensing a second condition of the structure, generating a first set of weighted likelihoods based on the first sensed condition of the structure, wherein the first set of weighted likelihoods includes a weighted likelihood of the tag being at each one of a plurality of grid points within the structure, generating a second set of weighted likelihoods based on the second sensed condition of the structure, wherein the second set of weighted likelihoods includes a weighted likelihood of the tag being at each one of the plurality of grid points, generating a combined set of likelihoods based on the first set of weighted likelihoods and the second set of weighted likelihoods, and estimating a location of the tag based on the combined set of likelihoods.

16 Claims, 10 Drawing Sheets

(56) References Cited

U.S. PATENT DOCUMENTS

| | | |
|---|---|---|
| 6,188,181 B1 | 2/2001 | Sinha et al. |
| 6,342,994 B1 | 1/2002 | Cousy et al. |
| 6,548,967 B1 | 4/2003 | Dowling et al. |
| 6,763,013 B2 | 7/2004 | Kennedy |
| 6,909,921 B1 | 6/2005 | Bilger |
| 7,167,094 B2 | 1/2007 | Ciarcia et al. |
| 7,297,929 B2 | 11/2007 | Cernasov et al. |
| 7,309,985 B2 | 12/2007 | Eggers et al. |
| 7,348,736 B2 | 3/2008 | Piepgras et al. |
| 7,437,596 B2 | 10/2008 | McFarland |
| 7,382,271 B2 | 12/2008 | McFarland |
| 7,468,666 B2 | 12/2008 | Clarcia et al. |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |
| 7,812,543 B2 | 10/2010 | Budike, Jr. |
| 7,925,384 B2 | 4/2011 | Huizenga et al. |
| 8,368,321 B2 | 2/2013 | Chemel et al. |
| 8,494,554 B2 * | 7/2013 | Marti ............... H04W 4/029 |
| | | 455/456.1 |
| 8,587,225 B2 | 11/2013 | Ashar et al. |
| 8,712,686 B2 | 4/2014 | Bandyopadhyay et al. |
| 8,796,958 B2 | 8/2014 | Billig et al. |
| 9,006,996 B2 | 4/2015 | Mohan et al. |
| 9,185,542 B1 * | 11/2015 | Boyle ............... H04W 4/029 |
| 9,240,111 B2 | 1/2016 | Scott et al. |
| 9,345,115 B2 | 5/2016 | Mohan |
| 9,374,678 B2 | 6/2016 | Gupta et al. |
| 9,585,227 B2 | 2/2017 | Mohan et al. |
| 9,936,342 B2 * | 4/2018 | Huang ............... H04W 4/40 |
| 10,404,387 B1 | 9/2019 | Devison et al. |
| 10,600,314 B1 | 3/2020 | Manku et al. |
| 10,602,311 B2 | 3/2020 | Choi et al. |
| 2004/0002792 A1 | 10/2004 | Hoffknecht |
| 2005/0169643 A1 | 8/2005 | Franklin et al. |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2007/0291483 A1 | 12/2007 | Lys |
| 2008/0185597 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2009/0267540 A1 | 10/2009 | Chemel et al. |
| 2010/0026479 A1 | 2/2010 | Tran |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0280677 A1 | 11/2010 | Budike, Jr. |
| 2010/0295482 A1 | 11/2010 | Chemel et al. |
| 2010/0301777 A1 | 12/2010 | Chemel et al. |
| 2011/0031897 A1 | 2/2011 | Henig et al. |
| 2011/0199010 A1 | 8/2011 | Henig et al. |
| 2011/0244887 A1 | 10/2011 | Dupray et al. |
| 2012/0108294 A1 | 5/2012 | Kaul |
| 2012/0130632 A1 | 5/2012 | Bandyopadhyay et al. |
| 2012/0293075 A1 | 11/2012 | Engelen et al. |
| 2012/0316414 A1 | 12/2012 | Greene |
| 2013/0141554 A1 | 6/2013 | Ganick et al. |
| 2013/0234607 A1 | 9/2013 | Kim et al. |
| 2013/0293877 A1 | 11/2013 | Ramer et al. |
| 2014/0274116 A1 * | 9/2014 | Xu ............... G01S 11/06 |
| | | 455/456.1 |
| 2014/0285095 A1 | 9/2014 | Chemel et al. |
| 2015/0008831 A1 | 1/2015 | Carrigan et al. |
| 2015/0076993 A1 | 3/2015 | Mohan |
| 2015/0223309 A1 | 8/2015 | Mohan et al. |
| 2016/0088438 A1 * | 3/2016 | O'Keeffe ............... H04W 4/21 |
| | | 455/456.2 |
| 2016/0219676 A1 | 7/2016 | Mohan et al. |
| 2016/0286624 A1 | 9/2016 | Patel et al. |
| 2017/0017214 A1 | 1/2017 | O'Keefe |
| 2017/0116483 A1 | 4/2017 | Richardson et al. |
| 2017/0127372 A1 | 5/2017 | Patel et al. |
| 2017/0127495 A1 | 5/2017 | Mohan et al. |
| 2017/0245116 A1 * | 8/2017 | Chu ............... H04W 4/043 |

* cited by examiner

MOBILE TAG SENSING AND LOCATION ESTIMATION

RELATED APPLICATIONS

This patent application claims priority to U.S. Provisional Patent Application Ser. No. 62/568,032, filed Oct. 4, 2017, which is herein incorporated by reference.

FIELD OF THE EMBODIMENTS

The described embodiments relate generally to building controls. More particularly, the described embodiments relate to location estimation of a mobile tag within a structure.

BACKGROUND

Intelligent building control provides for control of structure that is user intelligent. That is, based on behavior or predicted behavior of users within the structure, the intelligent building control provides the users with intelligent environmental controls, safety controls, logistical, and/or information control.

It is desirable to have a method, system and apparatus for predicting locations of an occupant or an asset, or a tag associated with the occupant or asset, within a structure.

SUMMARY

One embodiment includes a building control system. The building control system includes a plurality of first sensors, wherein the plurality of first sensors operates to sense a first condition of the structure. The building control system further includes a plurality of second sensors, wherein the plurality of second sensors operates to sense a second condition of the structure, and a controller. The controller operates to generate a first set of weighted likelihoods based on the first sensed condition of the structure, wherein the first set of weighted likelihoods includes a weighted likelihood of the mobile tag being at each one of a plurality of grid points within the structure, generate a second set of weighted likelihoods based on the second sensed condition of the structure, wherein the second set of weighted likelihoods includes a weighted likelihood of the mobile tag being at each one of the plurality of grid points within the structure, generate a combined set of likelihoods based on the first set of weighted likelihoods and the second set of weighted likelihoods, and estimate a location of the mobile tag within the structure based on the combined set of likelihoods.

Another embodiment includes a method. The method includes sensing, by a plurality of first sensors, a first condition of the structure, sensing, by a plurality of second sensors, a second condition of the structure, generating a first set of weighted likelihoods based on the first sensed condition of the structure, wherein the first set of weighted likelihoods includes a weighted likelihood of a mobile tag being at each one of a plurality of grid points within the structure, generating a second set of weighted likelihoods based on the second sensed condition of the structure, wherein the second set of weighted likelihoods includes a weighted likelihood of the mobile tag being at each one of the plurality of grid points within the structure, generating a combined set of likelihoods based on the first set of weighted likelihoods and the second set of weighted likelihoods, and estimating a location of the mobile tag within the structure based on the combined set of likelihoods.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses, and systems for generating weighted likelihood maps for estimating a location of a mobile tag. A first weighted likelihood map is generated based on sensed signals of a first type of sensor. A second weighted likelihood map is generated based on sensed signals of a second type of sensor. A combined set of likelihoods is generated based on the first set of weighted likelihoods and the second set of weighted likelihoods. A location of the mobile tag within the structure is estimated based on the combined set of likelihoods. Additional weighted likelihood maps can be generated to improve the estimation of the location of the mobile tag. For an embodiment, grid points within a structure are identified, and weighted likelihoods of the tag being located at different grid points are estimated. For at least some embodiments, the weighted likelihoods are supplemented with information associated with the tag. At least some embodiments include supplementing building control and/or building intelligence with the estimated location of the mobile tag.

Figure 1:
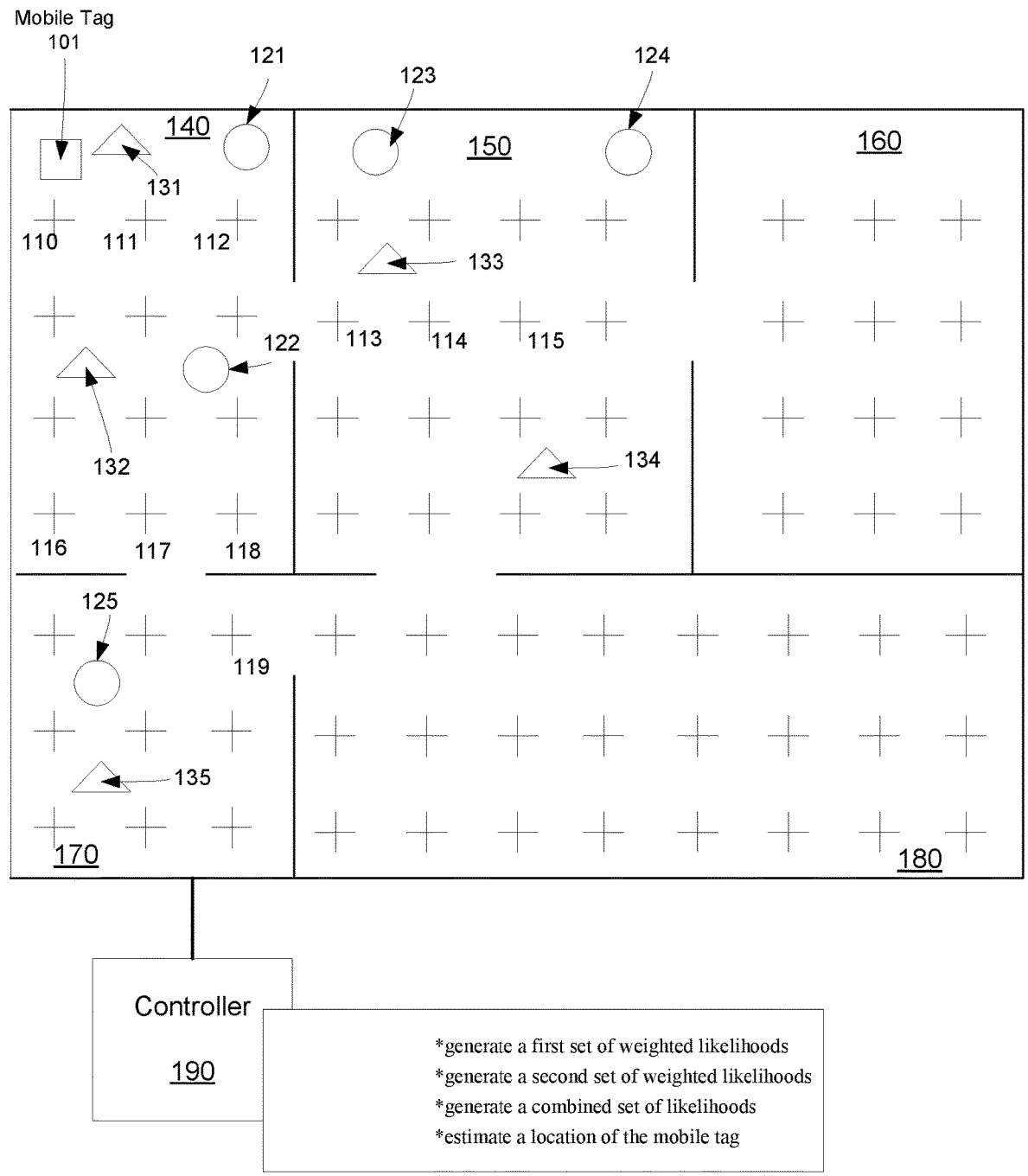
FIG. 1 shows a structure that includes a first set of sensors, a second set of sensors, and a controller that estimates a location of a mobile tag based on sensed signals of the first and second sets of sensors, according to an embodiment.

FIG. 1 shows a structure that includes a first set of sensors 121, 122, 123, 124, 125, a second set of sensors 131, 132, 133, 134, 135, and a controller 190 that estimates a location of a mobile tag 101 based on sensed signals of the first set of sensors 121, 122, 123, 124, 125, and the second set of sensors 131, 132, 133, 134, 135, according to an embodiment. For an embodiment, the first set of sensors 121, 122, 123, 124, 125 sense a first condition of the structure. For an embodiment, the second set of sensors 131, 132, 133, 134, 135 sense a second condition of the structure For an embodiment, the structure is represented by grid points. The grid points provide an overlay that section up the structure, wherein each grid point represents a different location within the structure. For an embodiment, the grid points are evenly-spaced throughout the structure. Exemplary grid points are shown in FIG. 1 as grid points 110, 111, 112, 113, 114, 115, 116, 117, 118, 119. Note that in FIG. 1 many of the grid points do not have reference designators. As shown in FIG. 1, the structure includes several rooms 140, 150, 160, 170, 180 which all include grid points.

For at least some embodiments, a controller 190 is connected to each of the first set of sensors 121, 122, 123, 124, 125, and the second set of sensors 131, 132, 133, 134, 135. The connection between the controller 190 and each sensor can include wired or wireless connections. For an embodiment, each sensor includes a wireless router, and the connection between the controller and each of the sensors can include one or more wireless hops through one or more other sensors.

For at least some embodiments, the controller 190 operates to generate a first set of weighted likelihoods based on the first sensed condition of the structure, wherein the first set of weighted likelihoods includes a weighted likelihood of the mobile tag 101 being at each one of a plurality of grid points within the structure. That is, based on the sensing by the first set of sensors, the controller generates a weighted likelihood that the mobile tag 101 is at each of the grid points. For an embodiment, the first set of sensor includes motion sensors that each sense motion within the structure. Based on the sensed motion, of each of the first set of sensors, the controller generates a map of the grid points that includes a weighted likelihood that the mobile tag 101 is located at each of the grid points.

Further, for at least some embodiments, the controller 190 operates to generate a second set of weighted likelihoods based on the second sensed condition of the structure, wherein the second set of weighted likelihoods includes a weighted likelihood of the mobile tag 101 being at each one of the plurality of grid points within the structure. That is, based on the sensing by the second set of sensors, the controller generates a weighted likelihood that the mobile tag is at each of the grid points. For an embodiment, the second set of sensor includes RF (radio frequency) sensors that each sense wireless signals within the structure. Based on the RF signals of each of the first set of sensors, the controller generates a map of the grid points that includes a weighted likelihood that the mobile tag 101 is located at each of the grid points.

For at least some embodiments, at least one of the first set of sensor, the second set of sensor, or a third set of sensor includes acoustic sensors. For an embodiment, sound vibrations generated by the mobile tag are sensed by the acoustic sensors. A time of flight can be estimated by knowing when the sound vibrations are generated and by knowing when the sound vibrations are sensed by the acoustic sensors. Based on a time of flight, the distance between the mobile tag and the acoustic sensors can be estimated. A set of weighted likelihoods of the mobile tag 101 being at each one of the plurality of grid points within the structure can be generated by the distance estimates determined through the use of the acoustic sensors.

For at least some embodiments, after generating the first set of weighted likelihoods and the second set of weighted likelihoods, the controller 190 operates to generate a combined set of likelihoods based on the first set of weighted likelihoods and the second set of weighted likelihoods. It is to be understood that the combined set of likelihoods can include any number of possible sets of weighted likelihoods.

For at least some embodiments, the controller operates to estimate a location of the mobile tag 101 within the structure based on the combined set of likelihoods. That is, the combined set of likelihoods includes a weighted likelihood that the mobile tag is located at each of the grid points. The combined set of likelihoods is based on at least the weighted likelihoods of the first set of sensors and the weighted likelihoods second set of sensors. The location of the mobile tag 101 can be estimated based on the locations of the grid points corresponding with the greatest weighted likelihoods of the combined set of likelihoods.

Figure 2:
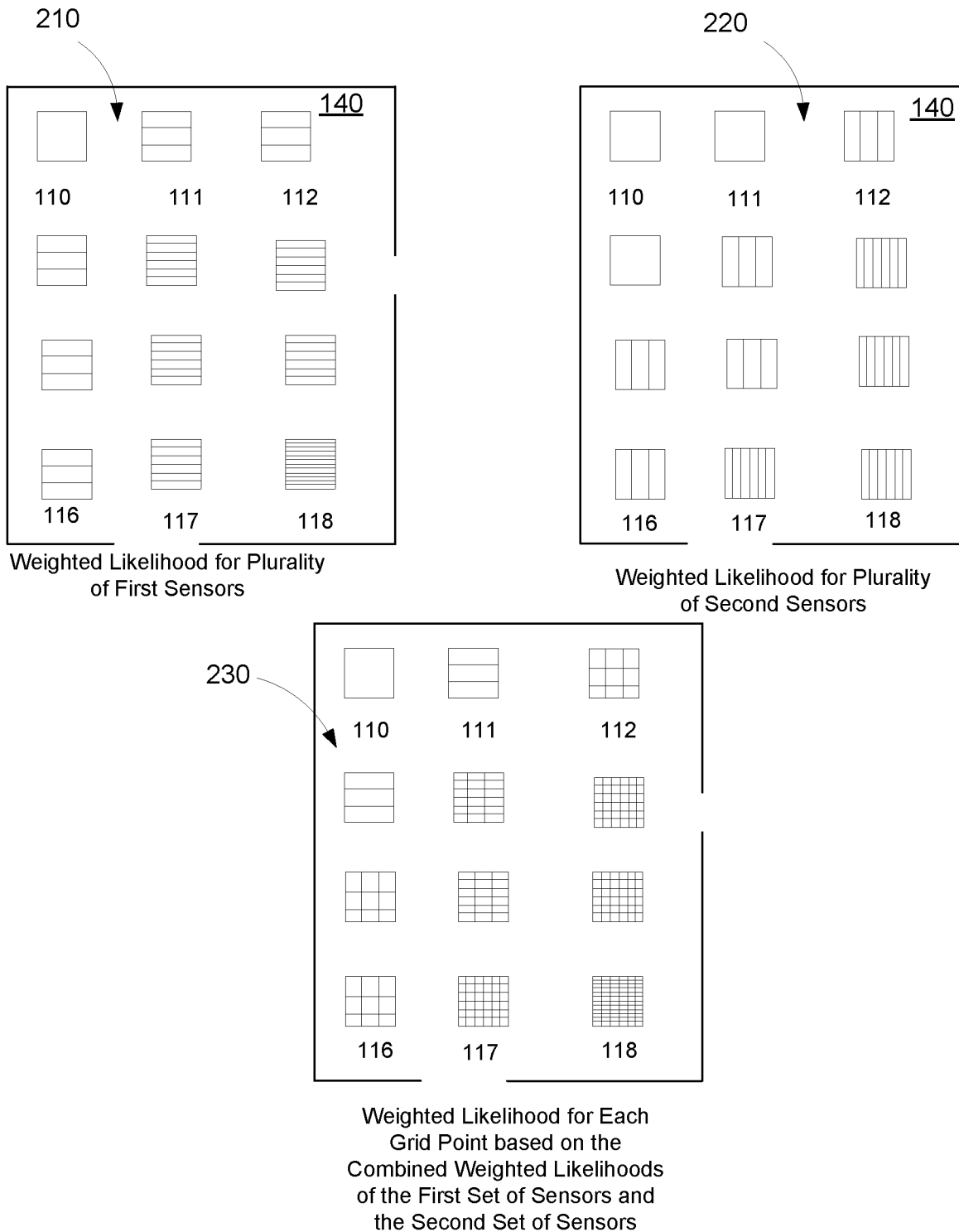
FIG. 2 shows maps of weighted likelihoods for the first set of sensors and for the second set of sensors, and a combined weighted likelihood map based on the maps of the weighted likelihoods for the first set of sensors and for the second set of sensors.

FIG. 2 shows maps 210, 220 of weighted likelihoods for the first set of sensors and for the second set of sensors, and a combined weighted likelihood map 230 based on the maps 210, 220 of the weighted likelihoods for the first set of sensors and for the second set of sensors. The maps 210, 220, 230 of FIG. 2 show weighted likelihoods of the mobile tag being at grid points 110, 111, 112, 116, 117, 118 and other non-referenced grid points within the room 114 of the structure.

The exemplary map 210 shows a weighted likelihood that the mobile tag is at each of the grid points based on the sensed first condition of the structure as sensed by the plurality of first sensors. This map represents a greater likelihood with more cross-hatch lines. That is, the weighted likelihood at the grid point 110 (no cross-hatching) is less than the weighted likelihood at the grid point 118 (more cross-hatching).

The exemplary map 220 shows a weighted likelihood that the mobile tag is at each of the grid points based on the sensed second condition of the structure as sensed by the plurality of second sensors. Again, this map represents a greater likelihood with more cross-hatch lines. That is, the weighted likelihood at the grid point 110 (no cross-hatching) is less than the weighted likelihood at the grid point 118 (more cross-hatching).

The exemplary map 230 shows the combined weighted likelihoods of the weighted likelihoods of the first sensed condition and the weighted likelihoods of the second sensed condition. As previously described, additional weighted likelihood maps can be created and included in the determination of the combined weighted likelihoods map 230.

After the combined weighted likelihoods map 230 has been created, the location of the mobile tag can be estimated based on the grid points of the combined weighted likelihoods map 230 that indicate the greatest likelihood.

Figure 3:
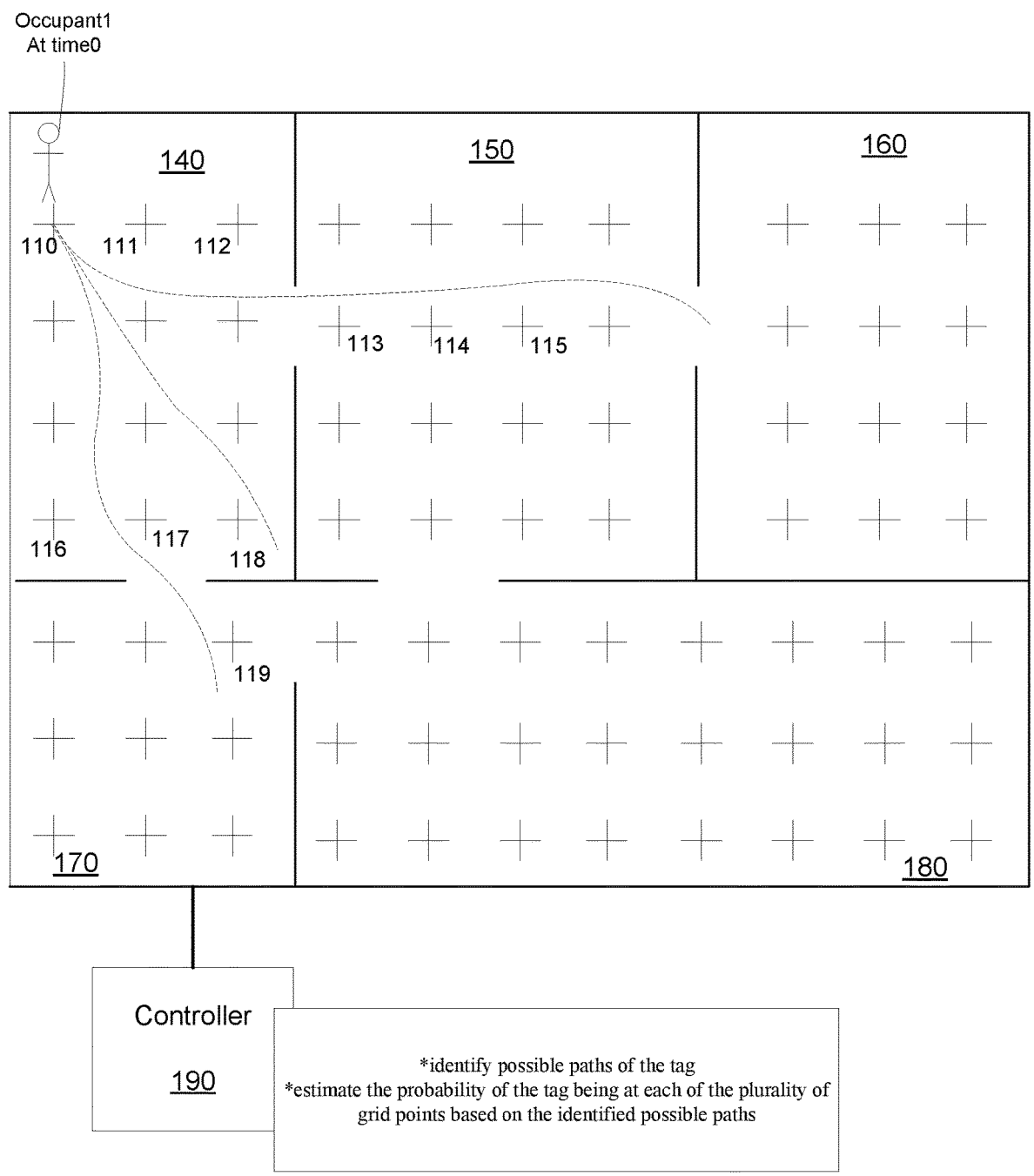
FIG. 3 shows a structure, wherein the structure is characterized by grid points and another weighted likelihood map can be created by identifying possible paths of the mobile tag, according to an embodiment.

FIG. 3 shows a structure, wherein the structure is characterized by the grid points and another weighted likelihood map can be created by identifying possible paths of the mobile tag 101, according to an embodiment. As shown, the exemplary structure includes the rooms 140, 150, 160, 170, 180. Further, as shown, the structure includes the grid points (such as, grid points 110, 111, 112, 113, 114, 115, 116, 117, 118, 119) at various locations within the structure. For at least some embodiments, an occupant or user of the mobile tag (for example, as depicted at time t0) is located at a location (such as defined by grid point 110). For at least some embodiments, the occupant possesses (or is attached to) the previously described mobile tag 101. For descriptive purposes, the term occupant and mobile tag may be used interchangeably. For at least some embodiments, the likelihood that the occupant is located at another grid point in the future is estimated. Many factors can be utilized in the estimation.

For an embodiment, the controller 190 associated with the structure performs the estimating. While shown as a single controller 190, it is to be understood that the processing of the depicted controller 190 can be performed by a distributed set of processors. Further, the process may be performed remotely.

For an embodiment the controller 190 is operative to determine an initial location of a tag at an initial time, determine a floor plan of a structure, and estimate a probability (likelihood) that at a future point in time that the tag is located at each of a plurality of grid points, wherein each of the plurality of grid points is associated with a different location within the structure. For at least some embodiments, estimating the probability (likelihood) that at the future point in time that the tag is located at each of the plurality of grid points, includes identifying possible paths of the tag, estimating the probability of the tag being at each of the plurality of grid points based on the identified possible paths, a difference between the future point in time and the initial time, and a distance between the initial position and positions of each of the plurality of grid points.

For at least some embodiments, the controller 190 further operates to generate the combined set of likelihoods based on the first set of weighted likelihoods, the second set of weighted likelihoods, and the third set of weighted likelihoods. That is, for example, a third weighted likelihood map is generated, and this third map is additionally used in the determination of the combined set of likelihoods.

Figure 4:
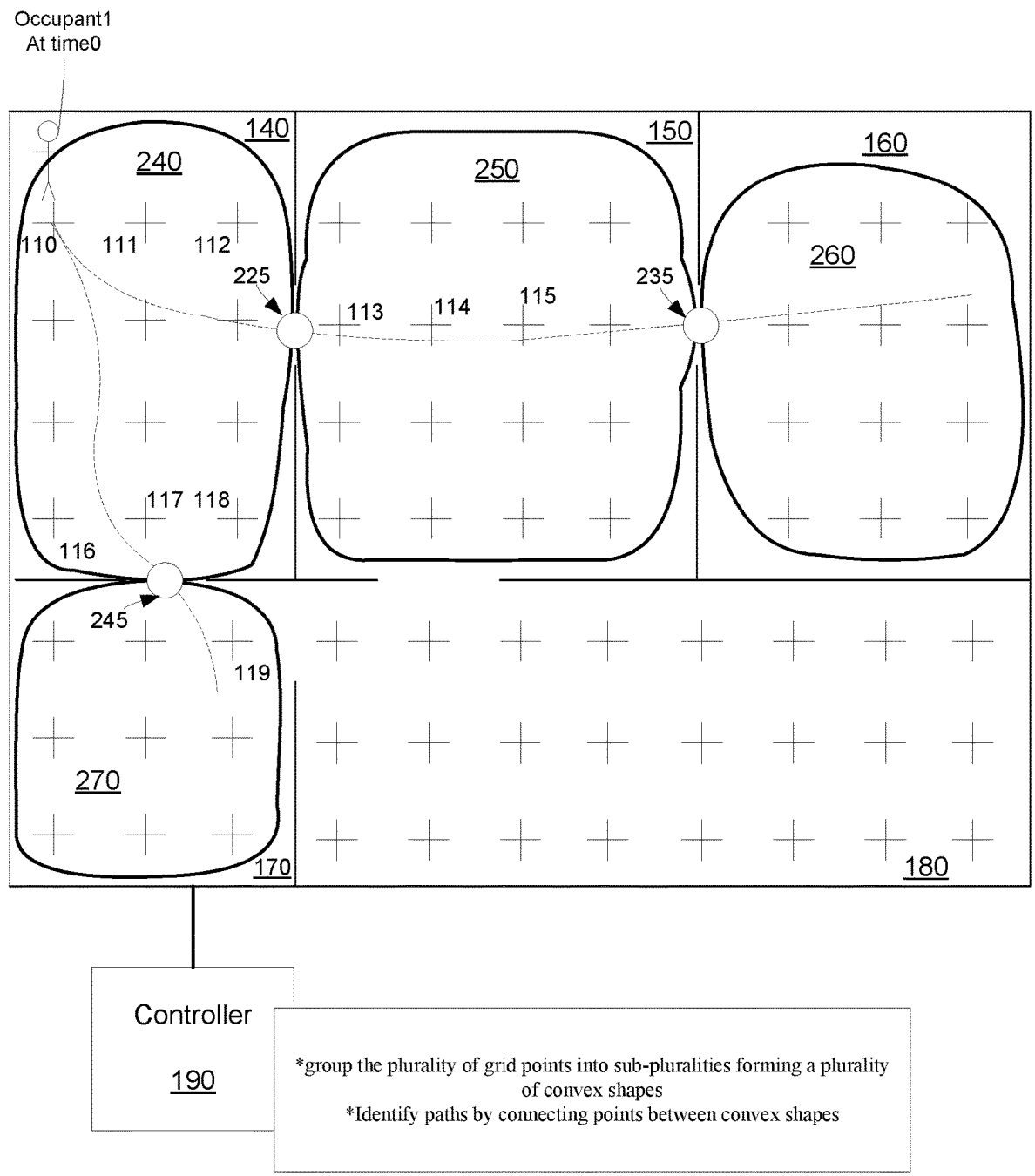
FIG. 4 shows a structure, wherein the structure is characterized by convex shapes that include grid points, according to an embodiment.

FIG. 4 shows a structure, wherein the structure is characterized by convex shapes that include the grid points, according to an embodiment. As shown, the barriers or walls of the structure define areas in which possible paths of the occupant cannot cross. For an embodiment, the physical barriers or walls of the structure define convex shapes 240, 250, 260, 270, wherein each of the convex shapes includes groups of grid points. That is, for at least some embodiments, the total number of grid points within the structure and grouped into sub-groups forming a plurality of convex shapes (such as, convex shapes 240, 250, 260, 270).

Further, for at least some embodiments, estimating the probability of the tag being at each of the plurality of grid points includes estimating a probability the tag is within the convex shape associated with the grid point. As shown, for at least some embodiments, a shape of each of the plurality of convex shapes is defined by barriers of the structure, and connecting points 225, 235, 245 between each of the plurality of convex shapes 240, 250, 260, 270 are defined by openings between the barriers of the structure. Further, for at least some embodiments, each of the possible paths pass through the connecting points between the convex shapes. For an embodiment, the connecting points are used for identifying paths through the structure.

Utilizing convex shapes that include multiple grid points can substantially improve the processing needed to determine the probability that the tag is at each of the plurality of grid points. That is, calculating the probability that the tag is at each of the plurality of grid points using information from all of the grid points takes substantially more computational power than calculating the probability that the tag is at each of the plurality of grid points using information from convex shapes, thereby improving the processing of controller that is operative to calculate the probability that the tag is at each of the plurality of grid points.

At least some embodiments include providing navigation between points (locations) of the structure. For at least some embodiments, knowledge of grid points, convex shapes of the grid points, and/or connecting points between the convex shapes are used in determining navigation between locations of the structure. For an embodiment, the connecting paths are utilized for determining a shortest path between location points within the structure. For example, a user or a mobile computing device (mobile tag) of the user can submit a request to the controller for a shortest path between a present location of the user or the mobile device of the user, and a specified or desired location of the user. For an embodiment, the controller uses the connecting points of the convex shapes of the grid points to identify the shortest path between the present location of the user and the desired or specified location of the user. Using the connecting points for the determination of the shortest path rather than all of the grid points substantially reduces the processing of the controller.

That is, for an embodiment, the controller provides a user with a shortest path between points for navigation between two points. As described, the utilization of the connecting points between the convex shapes provides the ability to determine point to point navigation using less processing than is all the grid points were to be utilized.

Figure 5:
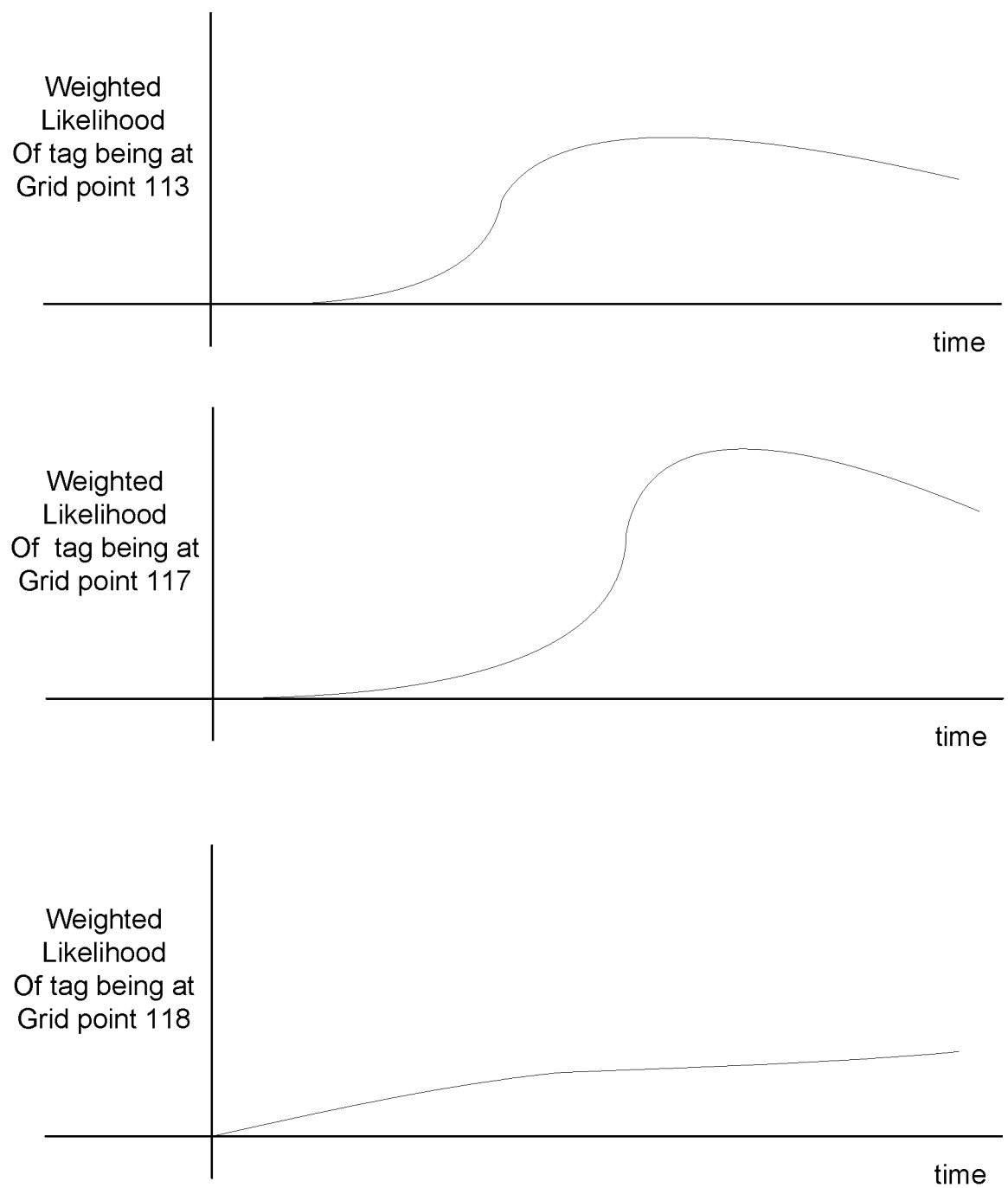
FIG. 5 shows time lines that depict estimated probabilities of a tag being located at specific grid points over time, according to an embodiment.

FIG. 5 shows time lines that depict the estimated weighted likelihood of a tag being located at specific grid points over time, according to an embodiment. For at least some embodiments, estimating the weighted likelihood that at the future point in time that the tag is located at each of the plurality of grid points 113, 117, 118, include generating the first set of weighted likelihoods based on the first sensed condition of the structure, wherein the first set of weighted likelihoods includes a weighted likelihood of the mobile tag being at each one of a plurality of grid points within the structure, generating a second set of weighted likelihoods based on the second sensed condition of the structure, wherein the second set of weighted likelihoods includes a weighted likelihood of the mobile tag being at each one of the plurality of grid points within the structure, generating a combined set of likelihoods based on the first set of weighted likelihoods and the second set of weighted likelihoods. For at least some embodiments, estimating the weighted likelihood that at the future point in time that the tag is located at each of the plurality of grid points 113, 117, 118, further includes identifying possible paths of the tag, estimating the probability of the tag being at each of the plurality of grid points 113, 117, 118 based on the identified possible paths, a difference between the future point in time and the initial time, and a distance between the initial position and positions of each of the plurality of grid points 113, 117, 118.

Figure 6:
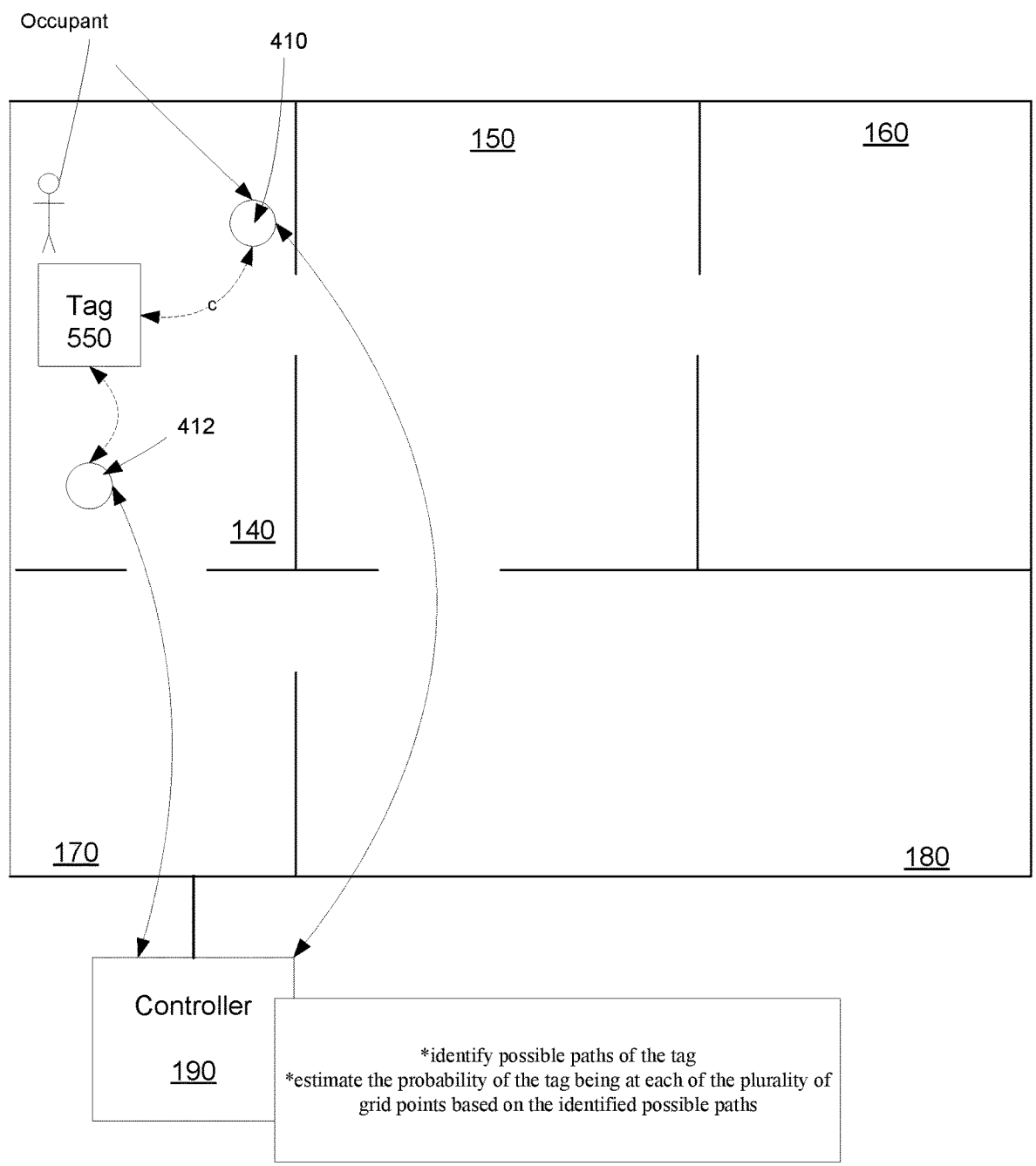
FIG. 6 shows a structure, wherein the structure includes a tag that communicates with a sensor of the structure, according to an embodiment.

FIG. 6 shows a structure, wherein the structure includes a tag 550 that communicates with a sensor 410 and/or 412 of the structure, according to an embodiment. The communication between the tag and the sensor can be facilitated by any form of communication. For an embodiment, the communication includes electromagnetic waves, such as, radio frequency (RF) or optical waves.

For at least some embodiments, the sensed parameter is associated with the tag 550. For at least some embodiments, the sensed parameter includes an estimate of a quality of a wireless link between the tag 550 and the one or more sensors 410, 412. For an embodiment, the one or more sensors include a transceiver, and the link quality includes a received signal strength indicator (RSSI) between the transceiver and the mobile tag 550. For an embodiment, the RSSI is determined by signals received by the one or more sensors from the mobile tag 550. For an embodiment, the RSSI is determined by signals received by the mobile tag 550 from the one or more sensors. For an embodiment, a distance between the mobile tag 550 and each of the sensors is approximated base on a different in signal power of transmitted signals relative to the RSSI. For an embodiment, the distance estimate between the mobile tag and each of the sensors is used to estimate the location of the mobile tag. For an embodiment, locations of each of the sensors is known, and the location of the mobile tag is estimated by triangulating using the known locations of the sensors and the estimated distance between each of the sensors and the mobile tag.

For at least some embodiments, at least one of the sensed parameter includes sensed motion of the tag. For an embodiment, sensing motion includes sensing whether are not the tag is moving. For an embodiment, sensing motion includes sensing a changing location of the tag, or detecting Significant Motion Detection of an Android virtual sensor. For an embodiment, the mobile tag includes a pedometer.

For an embodiment, the sensors (such as sensors 410, 412) include a motion sensor. For an embodiment, the motion sensor includes a passive infrared (PIR) sensor. For at least some embodiments, the sensed parameter includes sensed ambient light.

For at least some embodiments, the sensed parameter includes sensed acceleration of the tag. For an embodiment, the acceleration is sensed by the tag itself. For example, the tag can include an accelerometer that senses acceleration of the tag, which is then communicated to one of the sensors (such as, sensor 410, 412). For an embodiment, the acceleration is sensed by an external device. That is, the acceleration of the mobile tag can be sensed externally from the tag by another sensor.

For an embodiment, the acceleration is used to estimate orientation of the mobile tag with respect to gravity. Orientation of the mobile can be used to estimate expected RF strength due to antenna patterns and this expectation can be used to better calculate distance from a sensor and a probability of the distance of the tag from the sensor. For at least some embodiments, a compass and/or a gyroscope are used for orientation with respect to the earth, giving better orientation knowledge between one or more of the sensors and the mobile tag.

For at least some embodiments, orientation of the mobile tag provides information that can be used to determine how the peaks and nulls of the antenna patterns of the mobile tag alignment with one or more of the sensors. Accordingly, determinations of link qualities between the device and sensors can be more precisely determined and compensation for varying orientations of the tag and the varying antenna patterns that result due to the varying orientation of the tag. For an embodiment, the compensation improves estimates of the distance between the mobile tag and each the sensors, which can improve the location estimation of the mobile tag.

For at least some embodiments, the sensed parameter includes sensed motion of the tag, wherein the motion is sensed by the tag, and communicated to the one or more sensors. For at least some embodiments, the sensed parameter includes pedometer information from the tag. The motion sensed by the mobile tag and/or the pedometer information can be used to estimate distances traveled by the user of the mobile tag, and/or directions traveled by the user of the mobile tag. For at least some embodiments, the sensed parameter includes directional (such as, magnetic) information from the tag. For at least some embodiments, the sensed parameter includes tag orientation. Tag orientation may be delivered as a quaternion, euler angles, or rotational matrix.

For at least some embodiments, the sensed parameter includes sensed magnetic information from the tag. For at least some embodiments, the sensed magnetic information of the tag is utilized to generate magnetic mapping of the structure. For at least some embodiments, the sensed magnetic information is used to build a data base of a blue print of the structure.

Figure 7:
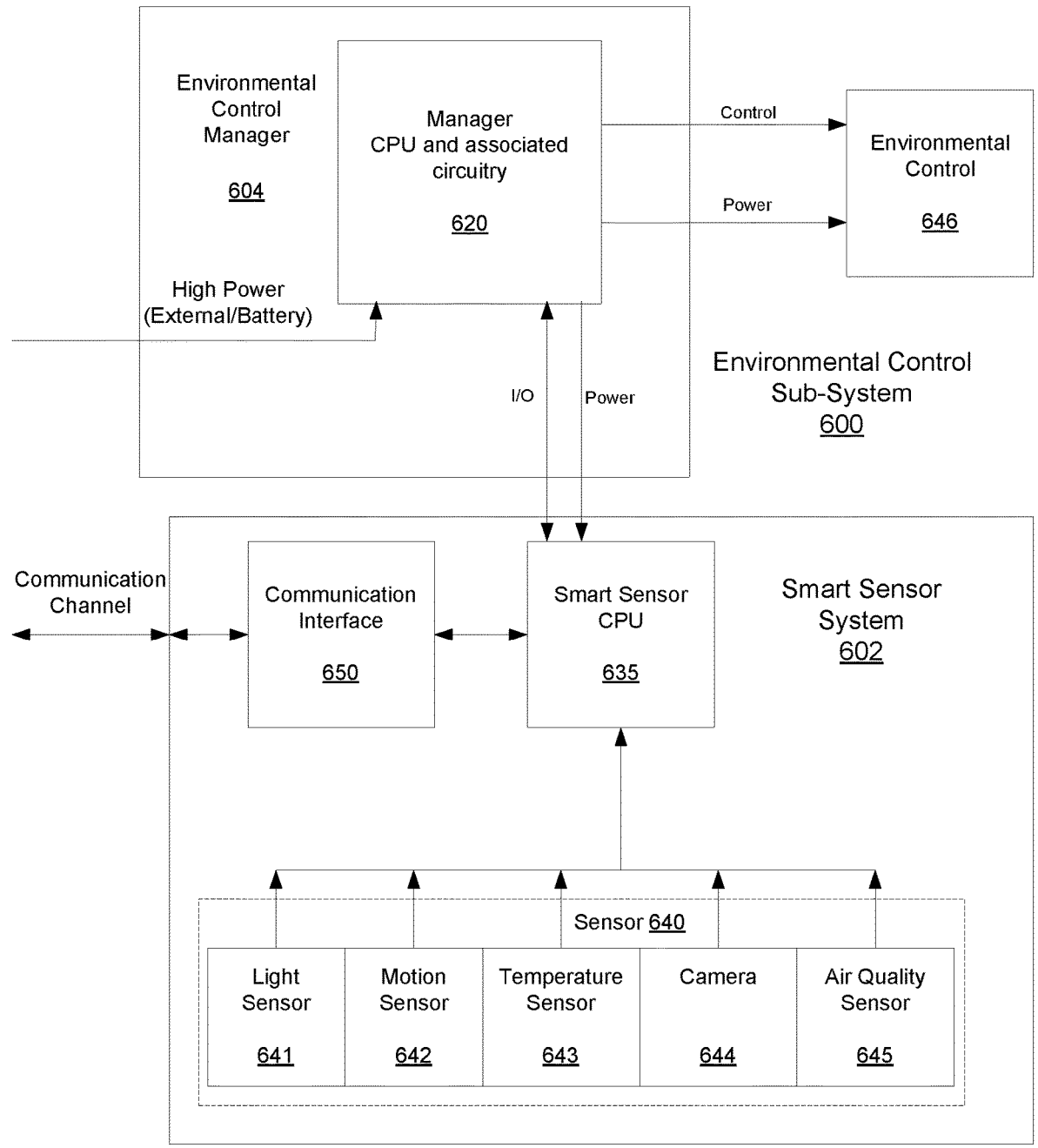
FIG. 7 shows a sensor of the structure, according to an embodiment.

FIG. 7 shows a sensor of the structure, according to an embodiment. An embodiment of a smart sensor system 602 (which operate as the previously described sensors) includes a smart sensor CPU 635, a set of sensors 640, and a communication interface 650. For an embodiment, a non-exhaustive list of sensors of the set of sensors 640 includes a light sensor 641, a motion sensor 642, a temperature sensor 643, a camera 644, and/or an air quality sensor 645. For an embodiment, the smart sensor system 602 along with an environmental control manager 604 provide and environmental control sub-system 600.

For at least some embodiments, one or more of the set of sensors 640 is used for sensing conditions within the structure for generating the first set of weighted likelihoods based on the first sensed condition of the structure, wherein the first set of weighted likelihoods includes a weighted likelihood of the mobile tag being at each one of a plurality of grid points within the structure, and generating a second set of weighted likelihoods based on the second sensed condition of the structure, wherein the second set of weighted likelihoods includes a weighted likelihood of the mobile tag being at each one of the plurality of grid points within the structure. As described, for at least some embodiments, the weighted likelihoods are used for estimating a location of the mobile tag.

For at least some embodiments, the estimated locations of the mobile tag are used for controlling an environmental condition of the structure. That is, knowing the locations (or estimates of the locations) of mobile tags and the users associated with the mobile tags allows for intelligent control of the environment of the structure. For example, areas of the structure that do not include any occupants (users) can have lights dimmed or turned off. Further, rooms with no occupants or a large number of occupants can be temperature (through, for example, an HVAC (heating, ventilation, and air conditioning) system of the structure) controlled accordingly.

For at least some embodiments, one or more of the set of sensors 640 are used for the sensing conditions which are additionally used to control the environment (for example, lighting control and or HVAC (heating, ventilation, and air conditioning) of the structure. That is, for an embodiment, the environment of the structure is controlled by both the predicted location of the mobile tag (which typically include many mobile tags) and sensed conditions of the smart sensor system 602. For example, if a large number of mobile tags are identified to be location within a common room of the structure, the temperature of the room can be adjusted lower for comfort or energy savings. Additionally, or alternatively, the lighting of the room can be adjusted up or down.

The communication interface 650 of the smart sensor system provides a communication channel for communicating with other smart sensors, with mobile tags, or with a backend server (such as, controller 190). The communication can include RF (radio frequency) communication, such as, WiFi or Bluetooth wireless communication.

The smart sensor CPU 635 provides intelligent control of the smart sensor system 602 by managing the communication and for some embodiments providing at least a portion of the location determination of the mobile tag(s).

The environmental control manager 604 which includes a managing CPU 620 receives control information from the smart sensor system 603 and provides control of an environmental control unit 646. For an embodiment, the environmental control unit 646 includes an HVAC (heating, ventilation, and air conditioning) system. For an embodiment, the environmental control unit 646 includes lighting control. For an embodiment, the environmental control unit 646 includes HVAC (heating, ventilation, and air conditioning) and lighting control.

Figure 8:
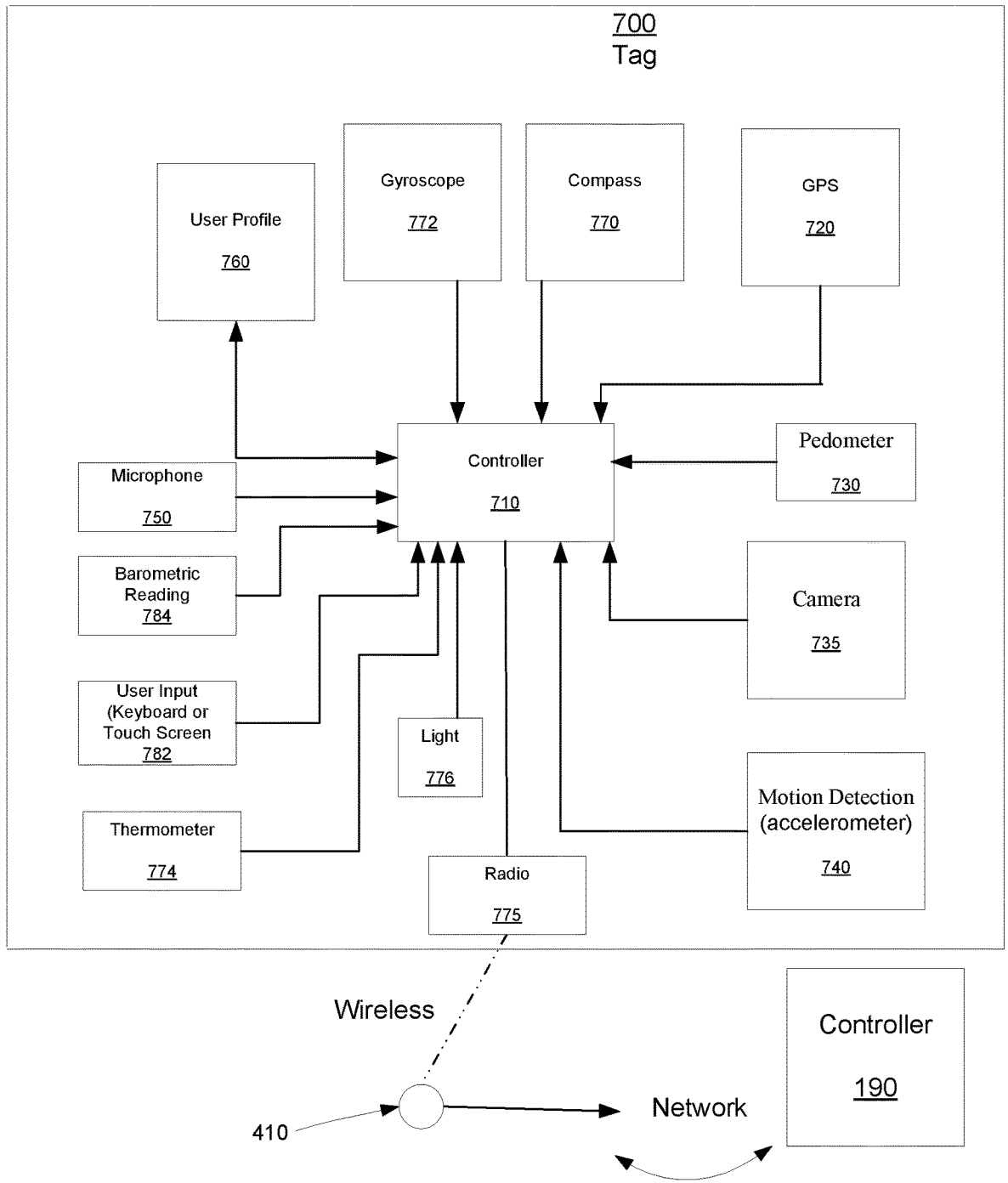
FIG. 8 shows a tag associated with an occupant of the structure, according to an embodiment.

FIG. 8 shows a mobile tag 700 associated with an occupant of the structure, according to an embodiment. As previously described, for at least some embodiments, the mobile tag 700 provides sensed information that can be additionally used to estimate a location of the mobile tag 700 within the structure. For an embodiment, the sensed information of the mobile tag 700 is used to generate another set of weighted likelihoods, wherein the set of weighted likelihoods includes a weighted likelihood of the mobile tag 700 being at each one of a plurality of grid points within the structure.

For an embodiment, the sensed information of the mobile tag 700 is communicated to the controller 190, to aid in location determination of the mobile tag 700. For an embodiment, the mobile tag 700 communicates with a sensor 410 which is connected to an upstream network that includes the controller 190.

As shown, for at least some embodiments, the mobile tag 700 includes a controller 710 that manages the sensed information and manages communication of the tag through, for example, a radio 775.

For at least some embodiments, a non-exhaustive list of sensors of the mobile tag includes a GPS (global positioning system) receiver 720, a pedometer 730, a camera 735, a motion detector 740, a microphone 750, a compass 770, a gyroscope 772, a barometric sensor 784, a thermometer 774, and/or a light sensor 776.

Further, for at least some embodiments, the mobile tag 700 includes a user profile 760 which can include customized information associated with the user of the mobile tag 700. The customized information can include tendencies and preferences of the user which can be used to further aid the location estimation of the mobile tag, and/or can be used to communicate preferential environmental control information which can be used along with the location estimation of the tag to control the environment of the structure in which the mobile tag is located.

Further, the mobile tag 700 can include a user input 782 (such as, a keyboard or touchscreen) to allow a user of the mobile tag to provide feedback information or user preferences. The feedback information of the user can be used to validate or invalidate the location estimations. For an embodiment, the user feedback influences future location estimations.

Figure 9:
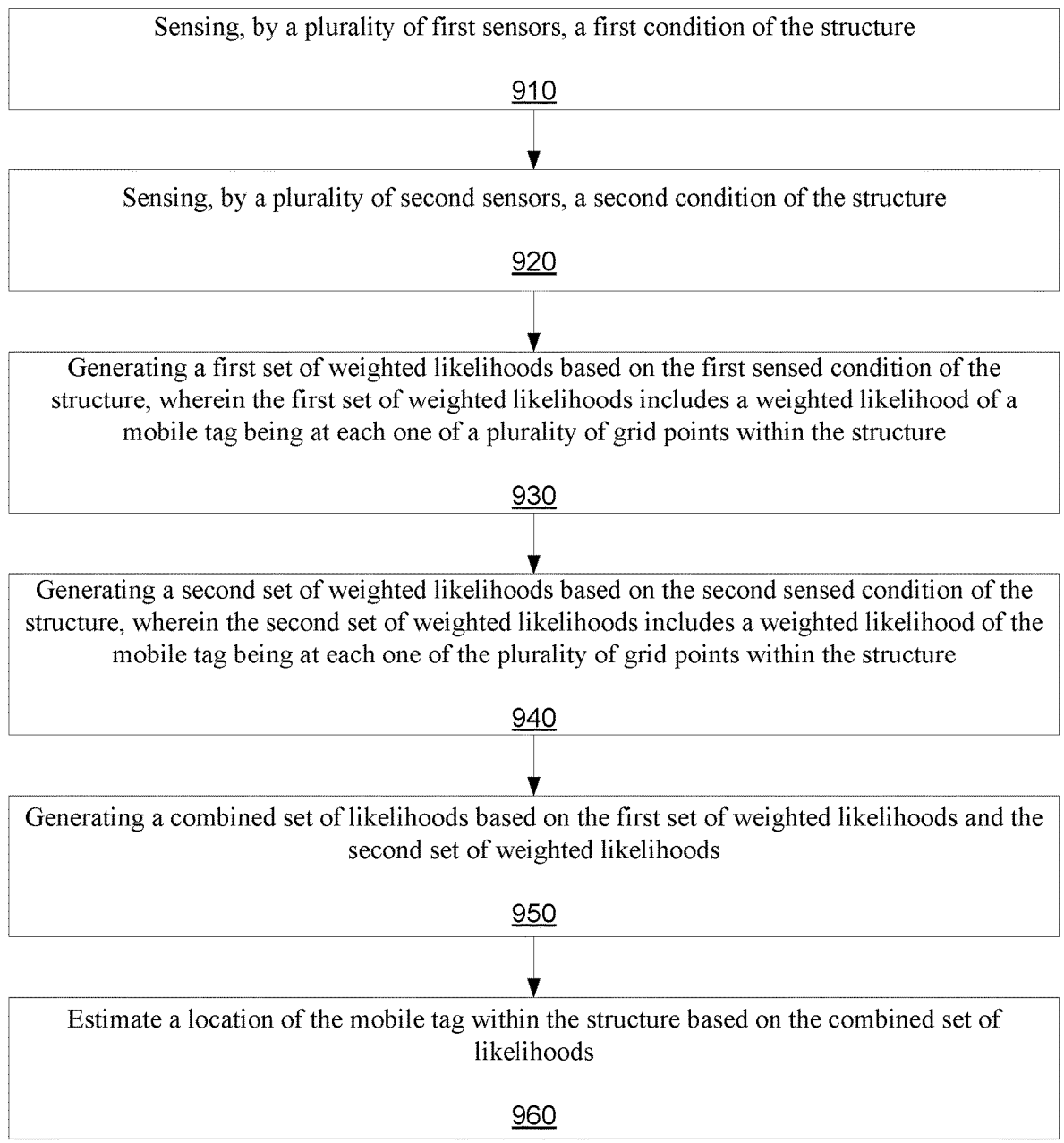
FIG. 9 is a flow chart that includes steps of a method of estimating weighted likelihood of a mobile tag being at grid points of a structure, according to an embodiment.

FIG. 9 is a flow chart that includes steps of a method of estimating weighted likelihood of a mobile tag being at grid points of a structure, according to an embodiment. A first step 910 includes sensing, by a plurality of first sensors, a first condition of the structure. A second step 920 includes sensing, by a plurality of second sensors, a second condition of the structure. A third step 930 includes generating a first set of weighted likelihoods based on the first sensed condition of the structure, wherein the first set of weighted likelihoods includes a weighted likelihood of a mobile tag being at each one of a plurality of grid points within the structure. A fourth step 940 includes generating a second set of weighted likelihoods based on the second sensed condition of the structure, wherein the second set of weighted likelihoods includes a weighted likelihood of the mobile tag being at each one of the plurality of grid points within the structure. A fifth step 950 includes generating a combined set of likelihoods based on the first set of weighted likelihoods and the second set of weighted likelihoods. A sixth step 960 includes estimating a location of the mobile tag within the structure based on the combined set of likelihoods.

As previously described, for at least some embodiments, the first plurality of sensors includes motion sensors, the second plurality of sensors comprises RF sensors, and wherein the combined set of likelihoods comprises an ensemble of the first set of weighted likelihoods and the second set of weighted likelihoods.

As previously described, for at least some embodiments, the first plurality of sensors comprises passive infrared (PIR) sensors and the sensed first condition of the structure comprises sensed motion of the structure. As previously described, for at least some embodiments, the second plurality of sensors comprises wireless transceivers and the sensed second condition of the structure comprises a received signal strength of wireless signals between the mobile tag and the second plurality of sensors.

For an embodiment, the amount of motion sensed by the motion sensors (such as, the PIR sensor) influences the weighted likelihood. That is, a motion sensor that senses larger amounts of motion is more likely to be proximate to the mobile tag. Further, for an embodiment, sensed motion of different motion sensors is used to disambiguate between different mobile tags. For an embodiment, a size of an asset associated with the tag influences the weighted likelihoods. That is, a larger asset may generate a larger sensed motion signal. The larger sensed motion due to the size of the asset can be accounted for.

Figure 10:
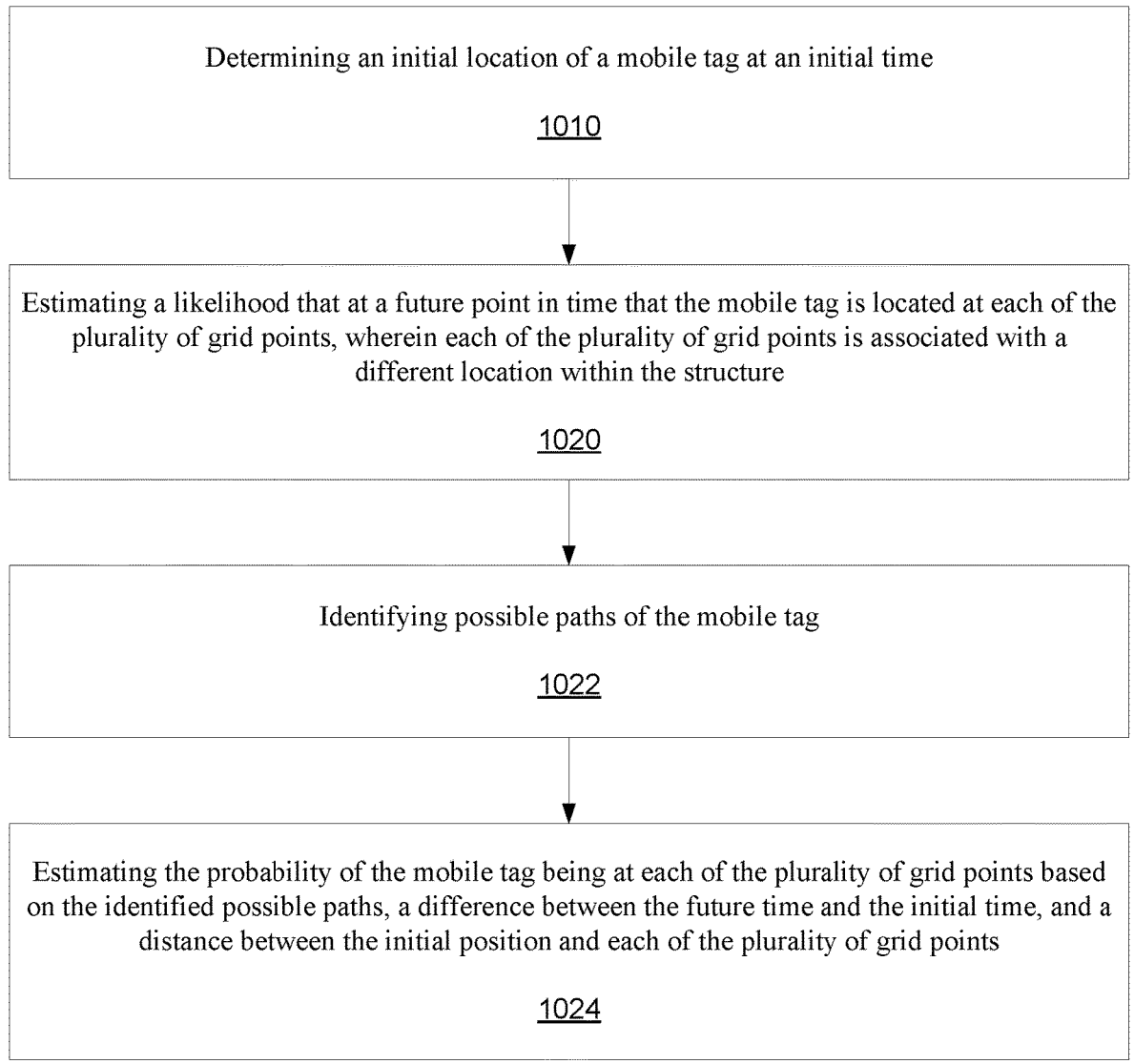
FIG. 10 is a flow chart that includes steps of a method of estimating weighted likelihood of a mobile tag being at grid points of a structure, according to an embodiment.

FIG. 10 is a flow chart that includes steps of a method of estimating weighted likelihood of a mobile tag being at grid points of a structure, according to an embodiment. A first step 1010 includes determining an initial location of the mobile tag at an initial time. A second step 1020 includes estimating a likelihood that at a future point in time that the mobile tag is located at each of the plurality of grid points, wherein each of the plurality of grid points is associated with a different location within the structure. For an embodiment, estimating the likelihood that at the future point in time that the mobile tag is located at each of the plurality of grid points includes a third step 1022 of identifying possible paths of the mobile tag, and a fourth step 1024 of generating a third set of weighted likelihoods of the mobile tag being at each of the plurality of grid points based on the identified possible paths, a difference between the future point in time and the initial time, and a distance between the initial position and positions of each of the plurality of grid points. For at least some embodiments, the grid points are equally spaced are substantially equally spaced throughout at least a portion of the structure.

Further, at least some embodiments include generating the combined set of likelihoods based on the first set of weighted likelihoods, the second set of weighted likelihoods, and the third set of weighted likelihoods.

For an embodiment, determining the initial location of the mobile tag at the initial time includes identifying when the user of the mobile tag enters the structure. The initial location is the entry point of the user.

For an embodiment, determining the initial location of the mobile tag at the initial time includes selecting a location based on the RSSI, without considering building walls constraints. Room level location consistency is used to select the initial location. That is, the number of times the RSSI indicates the tag is within a specific room of the structure can be used as an initial location determination.

For an embodiment, determining the initial location of the mobile tag at the initial time includes the user of the mobile device proactively sending a message that indicates an initial location of the user of the mobile tag. The initial location and the timing can be communicated, for example, to the controller 190.

As previously described, for an embodiment, the controller further operates to group the plurality of grid points into sub-pluralities forming a plurality of convex shapes, wherein each of the sub-pluralities of grid points define a convex shape within the structure, and wherein estimating the likelihood of the tag being at each of the plurality of grid points comprises estimating a likelihood the tag is within the convex shape associated with the grid point. As previously described, for an embodiment, a shape of each of the plurality of convex shapes is defined by barriers of the structure, and connecting points between each of the plurality of convex shapes are defined by openings between the barriers of the structure. As previously described, for an embodiment, each of the possible paths pass through the connecting points between convex shapes.

For at least some embodiments, the controller further operates to generate a fourth set of weighted likelihoods based on a physical shape of the structure or characteristics of the structure, and generate the combined set of likelihoods based on the first set of weighted likelihoods, the second set of weighted likelihoods, and the fourth set of weighted likelihoods. For at least some embodiments, the physical shape of the structure includes the physical shape and characteristics (such as, unique wall structure and/or materials) of the structure. For at least some embodiments, the physical shape of the structure includes the fourth weighted likelihood of each grid points being influenced by a proximity of grid point to walls. For at least some embodiments, the physical shape of the structure includes the fourth weighted likelihood of each grid points being influenced by detection of multipath signals within the structure. For at least some embodiments, the physical shape of the structure includes the fourth weighted likelihood of each grid points being influenced by determination of RF signal attenuation within the structure.

As previously described, for an embodiment, the controller further operates to receive a parameter sensed by the mobile tag. As previously described, for an embodiment, the parameter includes sensed acceleration of the mobile tag. As previously described, for an embodiment, the parameter comprises pedometer information from the tag. As previously described, for an embodiment, the parameter comprises directional (for example, magnetic) information from the tag. As previously described, for an embodiment, the parameter includes sensed magnetic information from the tag. As previously described, for an embodiment, the sensed magnetic information of the tag is utilized to generate magnetic mapping of the structure. As previously described, for an embodiment, the magnetic information is used to build a data base of a blue print of the structure.

While RSSI has been described as a method for determining distances between the mobile tag and the sensors, for at least some embodiments, ambient light sensor and other combinations of sensors other than RSSI/beacons are used for determining the distances. For an embodiment, a bi-direction BLE (Bluetooth enabled) radio of the magnetic tag is operative to both send and receive beacons from the sensor. For at least some embodiments, the mobile tag transmits tag beacons which are received by the sensors. For at least some embodiments, transmit power of the tag beacons is varied over time. Using lower transmit power reduces the number of sensors that will receive the message, which can provide greater location accuracy.

For an embodiment, a floor plan of the structure is either previously known, or is provided. For an embodiment, the floor plan in deduced, for example, by the controller 190 over time by sensing or tracking motion of tags/occupants over time. Walls, for example, can be identified because mobile tags never travel through walls.

For an embodiment, motion sensors, such as, PIR (passive infrared) sensors are used to time synchronized the sensors which can be used to aid the previously described triangulation.

Although specific embodiments have been described and illustrated, the described embodiments are not to be limited to the specific forms or arrangements of parts so described and illustrated. The embodiments are limited only by the appended claims.

What is claimed:

1. A building control system, comprising:
   a mobile tag, wherein the mobile tag operates to move within a structure;
   a plurality of first sensors, wherein the plurality of first sensors operate to sense a first condition of the structure;
   a plurality of second sensors, wherein the plurality of second sensors operate to sense a second condition of the structure;
   a controller, wherein the controller operates to:
      generate a first set of weighted likelihoods based on the first sensed condition of the structure, wherein the first set of weighted likelihoods includes a weighted likelihood of the mobile tag being at each one of a plurality of grid points within the structure;
      generate a second set of weighted likelihoods based on the second sensed condition of the structure, wherein the second set of weighted likelihoods includes a weighted likelihood of the mobile tag being at each one of the plurality of grid points within the structure;
      determine an initial location of the mobile tag at an initial time;
      estimate a likelihood that at a future point in time that the mobile tag is located at each of the plurality of grid points, wherein each of the plurality of grid points is associated with a different location within the structure, comprising:
         identify possible paths of the tag; and
         generate a third set of weighted likelihoods of the tag being at each of the plurality of grid points based on the identified possible paths, a difference between the future point in time and the initial time, and a distance between the initial position and positions of each of the plurality of grid points;
      generate a combined set of likelihoods based on the first set of weighted likelihoods, the second set of weighted likelihoods, and the third set of weighted likelihoods;
      determine a distance between the mobile tag and the plurality of first sensors based on at least one beacon received from the mobile tag by the plurality of first sensors; and estimate a location of the mobile tag within the structure based on the combined set of likelihoods and the distance determined based on the at least one beacon.

2. The system of claim 1, wherein the first plurality of sensors comprises motion sensors, the second plurality of sensors comprises RF sensors, and wherein the combined set of likelihoods comprises an ensemble of the first set of weighted likelihoods and the second set of weighted likelihoods.

3. The system of claim 1, wherein the first plurality of sensors comprises passive infrared (PIR) sensors and the sensed first condition of the structure comprises sensed motion of the structure.

4. The system of claim 3, wherein the second plurality of sensors comprises wireless transceivers and the sensed second condition of the structure comprises a received signal strength of wireless signals between the mobile tag and the second plurality of sensors.

5. The system of claim 1, wherein the controller further operates to:
group the plurality of grid points into sub-pluralities forming a plurality of convex shapes, wherein each of the sub-pluralities of grid points define a convex shape within the structure, and wherein estimating the likelihood of the tag being at each of the plurality of grid points comprises estimating a likelihood the tag is within the convex shape associated with the grid point.

6. The system of claim 5, wherein a shape of each of the plurality of convex shapes is defined by barriers of the structure, and connecting points between each of the plurality of convex shapes are defined by openings between the barriers of the structure.

7. The system of claim 6, wherein each of the possible paths pass through the connecting points between convex shapes.

8. The system of claim 1, wherein the controller further operates to:
generate a fourth set of weighted likelihoods based on a physical shape of the structure or characteristics of the structure; and
generate the combined set of likelihoods based on the first set of weighted likelihoods, the second set of weighted likelihoods, and the fourth set of weighted likelihoods.

9. The system of claim 1, wherein the controller further operates to receive a parameter sensed by the mobile tag.

10. The system of claim 9, wherein the parameter comprises sensed acceleration of the mobile tag.

11. The system of claim 9, wherein the parameter comprises pedometer information from the tag.

12. The system of claim 9, wherein the parameter comprises directional information from the tag.

13. The system of claim 9, wherein the parameter sensed magnetic information from the tag.

14. The system of claim 9, wherein the sensed magnetic information of the tag is utilized to generate magnetic mapping of the structure.

15. A method, comprising:
sensing, by a plurality of first sensors, a first condition of the structure;
sensing, by a plurality of second sensors, a second condition of the structure;
generating a first set of weighted likelihoods based on the first sensed condition of the structure, wherein the first set of weighted likelihoods includes a weighted likelihood of a mobile tag being at each one of a plurality of grid points within the structure;
generating a second set of weighted likelihoods based on the second sensed condition of the structure, wherein the second set of weighted likelihoods includes a weighted likelihood of the mobile tag being at each one of the plurality of grid points within the structure;
determining an initial location of the mobile tag at an initial time;
estimating a likelihood that at a future point in time that the mobile tag is located at each of the plurality of grid points, wherein each of the plurality of grid points is associated with a different location within the structure, comprising:
identifying possible paths of the mobile tag;
generating a third set of weighted likelihoods of the mobile tag being at each of the plurality of grid points based on the identified possible paths, a difference between the future point in time and the initial time, and a distance between the initial position and positions of each of the plurality of grid points;
generating a combined set of likelihoods based on the first set of weighted likelihoods, the second set of weighted likelihoods, and the third set of weighted likelihoods;
determining a distance between the mobile tag and the plurality of first sensors based on at least one beacon received from the mobile tag by the plurality of first sensors; and
estimating a location of the mobile tag within the structure based on the combined set of likelihoods and the distance determined based on the at least one beacon.

16. The method of claim 15, wherein the first plurality of sensors comprises motion sensors, the second plurality of sensors comprises RF sensors, and wherein the combined set of likelihoods comprises an ensemble of the first set of weighted likelihoods and the second set of weighted likelihoods.

* * * * *